T. J. TOLLACKSON.
LOCK NUT.
APPLICATION FILED FEB. 16, 1921.

1,433,433.

Patented Oct. 24, 1922.

Inventor
Theodore J. Tollackson,

By
Geo. P. Kimmel, Attorney

Patented Oct. 24, 1922.

1,433,433

UNITED STATES PATENT OFFICE.

THEODORE J. TOLLACKSON, OF WESTBY, WISCONSIN.

LOCK NUT.

Application filed February 16, 1921. Serial No. 445,578.

*To all whom it may concern:*

Be it known that I, THEODORE J. TOLLACKSON, a citizen of the United States, residing at Westby, in the county of Vernon and State of Wisconsin, have invented certain new and useful Improvements in Lock Nuts, of which the following is a specification.

This invention relates to nut locks and the primary object of the invention is to provide a novel and improved nut which will bind or lock itself on the threaded shank of a bolt when the said nut is turned thereon to a bearing surface.

One of the objects of the invention resides in the provision of a nut lock which is cut at an angle of substantially fifteen degrees from each corner thereof to provide a plurality of resilient tongues which will bind and grip the threads of the bolt as the nut is turned to engage a bearing.

Another and very important object of the invention is the construction of a nut lock which is extremely simple in design, capable of being manufactured at a very low cost, highly efficient and positive in operation and use, and otherwise meeting the requirements of structures of this character necessary to insure its commercial possibilities.

Figure 1:
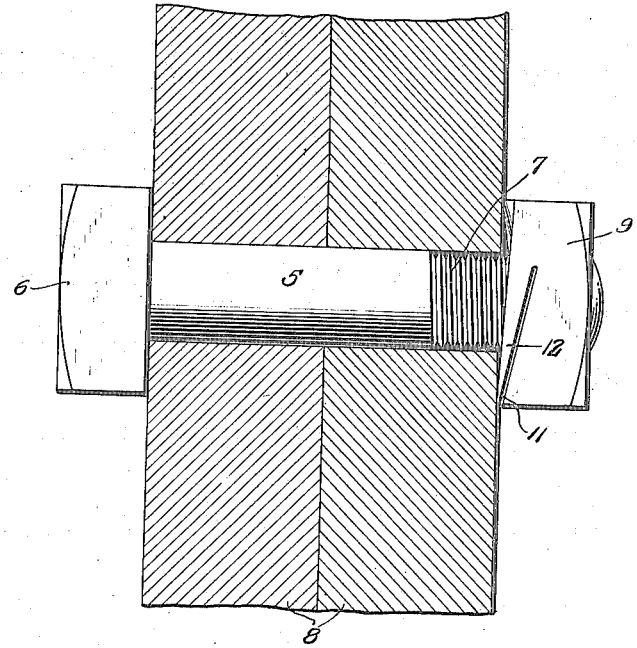

With these objects in view and others which will be manifest and suggested as the the purpose and nature of my invention are revealed in the following specification and drawing wherein I have shown a preferred embodiment thereof, Figure 1 is a side elevation showing the nut lock as applied in use.

Figure 2:
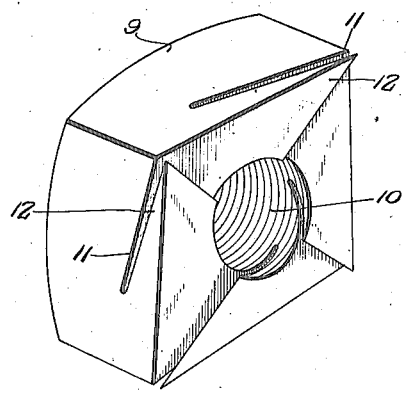

Fig. 2 is a perspective view of the nut lock.

Referring particularly to the drawing wherein similar characters designate like and corresponding parts throughout the various views, 5 designates a bolt having a head 6 on one end thereof and a threaded shank 7 on its opposite end, which shank is adapted to be passed through objects designated 8 which are to be clamped or held in rigid position. The square nut which I have designated by numeral 9 is of course provided with a threaded bore 10 extending entirely through the same for threaded engagement with the threaded shank 7 of the bolt 5.

Referring particularly to Fig. 2, it will be seen that the square nut 9 is provided with recesses 11, which are substantially at an angle of fifteen degrees with the base portion of the nut, said recesses being cut and extending entirely through the body of the threaded bore 10. By this construction, it will be readily seen that the recesses thus formed produce a plurality of gripping tongues 12 at the respective corners of the nut whereby as it is turned on the bolt and engages a bearing surface, the said tongues will grip the bearing surface thus locking the body thereto. It will of course be apparent that if the locking nut bears against an uneven surface, any one of the tongues 12 when engaging such surface will lock the body 9 as is well understood.

From the above description taken in connection with the accompanying drawings, it is thought that a clear and comprehensive understanding of the construction, operation and advantages of the invention are apparent and while I have shown and described the device as embodying a specific structure, I desire it to be understood that such changes may be made in the details set forth as do not depart from the spirit and scope of the invention and the subject matter being claimed. Accordingly, it will be readily recognized that all or certain of the recesses 11 may be cut at a greater or less angle than shown and if so desired at opposite diagonal corners only of the nut.

Having thus fully described my invention, what I now claim as new and desire to secure by Letters Patent of the U. S. is:—

A nut having the usual threaded central opening in its body and diagonal slots in the base, each cut through one corner and extended beyond one-half across the body and opening throughout its extent the outer side and central threaded opening, to provide pointed flexible tongues.

In testimony whereof, I affix my signature hereto.

THEODORE J. TOLLACKSON.